United States Patent [19]

Mattei et al.

[11] Patent Number: 4,530,147

[45] Date of Patent: Jul. 23, 1985

[54] METHOD OF GRAFTING A METAL REINFORCING MEMBER IN A STRUCTURE OF COMPOSITE FIBRE-RESIN MATERIAL

[75] Inventors: Jean P. Mattei, La Varenne Saint Hilaire; Pierre F. Coutin, Paris, both of France

[73] Assignee: R. Alkan & Cie, France

[21] Appl. No.: 528,909

[22] Filed: Sep. 2, 1983

[30] Foreign Application Priority Data

Sep. 9, 1982 [FR] France .................. 82 15276

[51] Int. Cl.³ .................. B23P 19/02; B23B 31/00
[52] U.S. Cl. .................. 29/525; 156/297
[58] Field of Search .............. 29/525, 428, 156.8 R; 156/297, 299

[56] References Cited

U.S. PATENT DOCUMENTS 3,788,162  1/1974  Rabenhorst et al. .............. 156/297

4,344,995  8/1982  Hammer .............................. 156/297

Primary Examiner—Howard N. Goldberg
Assistant Examiner—Steven Nichols
Attorney, Agent, or Firm—William A. Drucker

[57] ABSTRACT

This method is directed to provide an improved bond between the metal reinforcement and a composite material, notably at a node comprising the connection between walls and a flange of composite material. It comprises essentially the steps of incorporating a metal reinforcement in the form of an assembly of three elements, namely a first element in the form of a hollow cylinder having a relatively broad base and connected to the flange, a second element capping the first one and provided with fins extending along the walls to be connected to the flange, and a third intermediate element consisting of a washer interposed between the first and second elements so as to distribute the fin pressure over the base surface.

3 Claims, 9 Drawing Figures

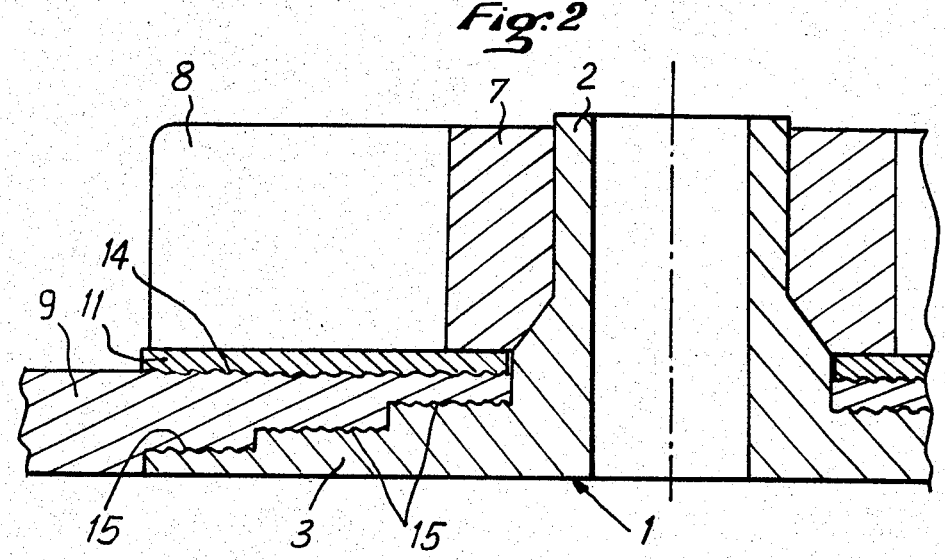
*Fig: 2*
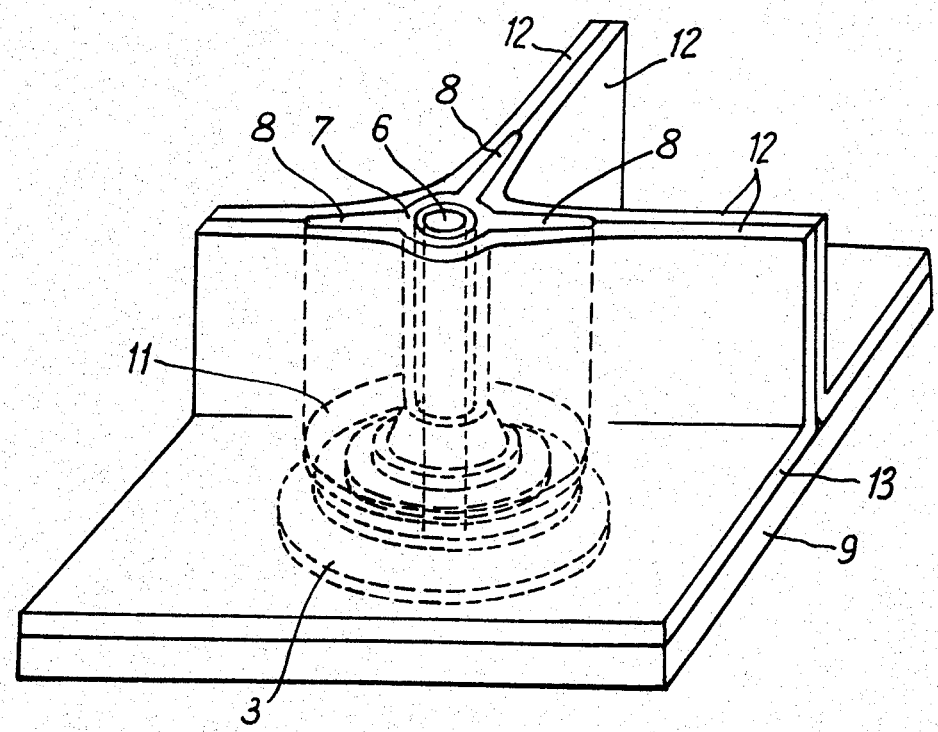
*Fig: 3*

METHOD OF GRAFTING A METAL REINFORCING MEMBER IN A STRUCTURE OF COMPOSITE FIBRE-RESIN MATERIAL

BACKGROUND OF THE INVENTION

The present invention relates in general to the reinforcing of composite fibre-resin materials by means of metal elements, and has specific reference to a method of incorporating such metal reinforcing elements in structures comprising at least one material of this type.

Though fibre-resin composite materials have a mechanical strength and a light weight adequate for justifying their use in many applications, it is sometimes necessary to incorporate locally therein metal reinforcing elements, notably in high stress concentration areas, notably for facilitating the assembly of two structures of which at least one consists of composite materials.

The chief difficulty encountered when attempting to obtain a sufficient bond between the metal reinforcing elements and the structure is that of covering a sufficient surface area of the metal element or elements with the successive layers of fiber-resin material in order to provide a sufficiently strong bond therebetween.

Now this difficulty appears more particularly when attempting to incorporate a metal reinforcement in a node of a structure comprising a flange on which several partitions constituting a triangular structure or latticework in the assembly are interconnected or merge together at a same point.

SUMMARY OF THE INVENTION

It is the primary object of the present invention to avoid the above-mentioned difficulty by providing a method of grafting a metal reinforcement capable of constituting an efficient bond between the reinforcement and the composite material, more particularly when assembling a flange to walls or partitions having different orientations and connected to this flange.

The method of the present invention is characterized in that it consists in incorporating in the composite structure, notably a node resulting from the junction of several partitions, a metal reinforcement in the form of an assembly of three elements comprising a first element consisting of a cylinder having a relatively broad base connected to one flange of said node, a second element capping the first element and provided with ribs or fins extending along said partitions and connected to the flange, and a third intermediate element consisting of a washer interposed between the first and second elements and adapted to distribute uniformly the pressure exerted by the ribs of the second element over the base of the first element.

A clearer understanding of the present invention will be had from the following description of its application to a structure, for example the structure of a half-shell adapted to be assembled with another symmetrical half-shell by using reinforcing elements incorporated by applying the method of this invention of which a typical form of embodiment is illustrated in the attached drawings.

THE DRAWINGS

FIG. 2 is a fragmentary half-section showing a detail of the assembly;

FIG. 3 is a perspective view showing the junction of the composite material with the various component elements of the metal reinforcement shown in FIG. 1, and FIGS. 4 to 9 are front or axial views showing typical forms of embodiment of the metal reinforcing element with variable numbers of ribs disposed in different orientations.

DESCRIPTION OF THE PREFERRED EMBODIMENTS

Figure 1:
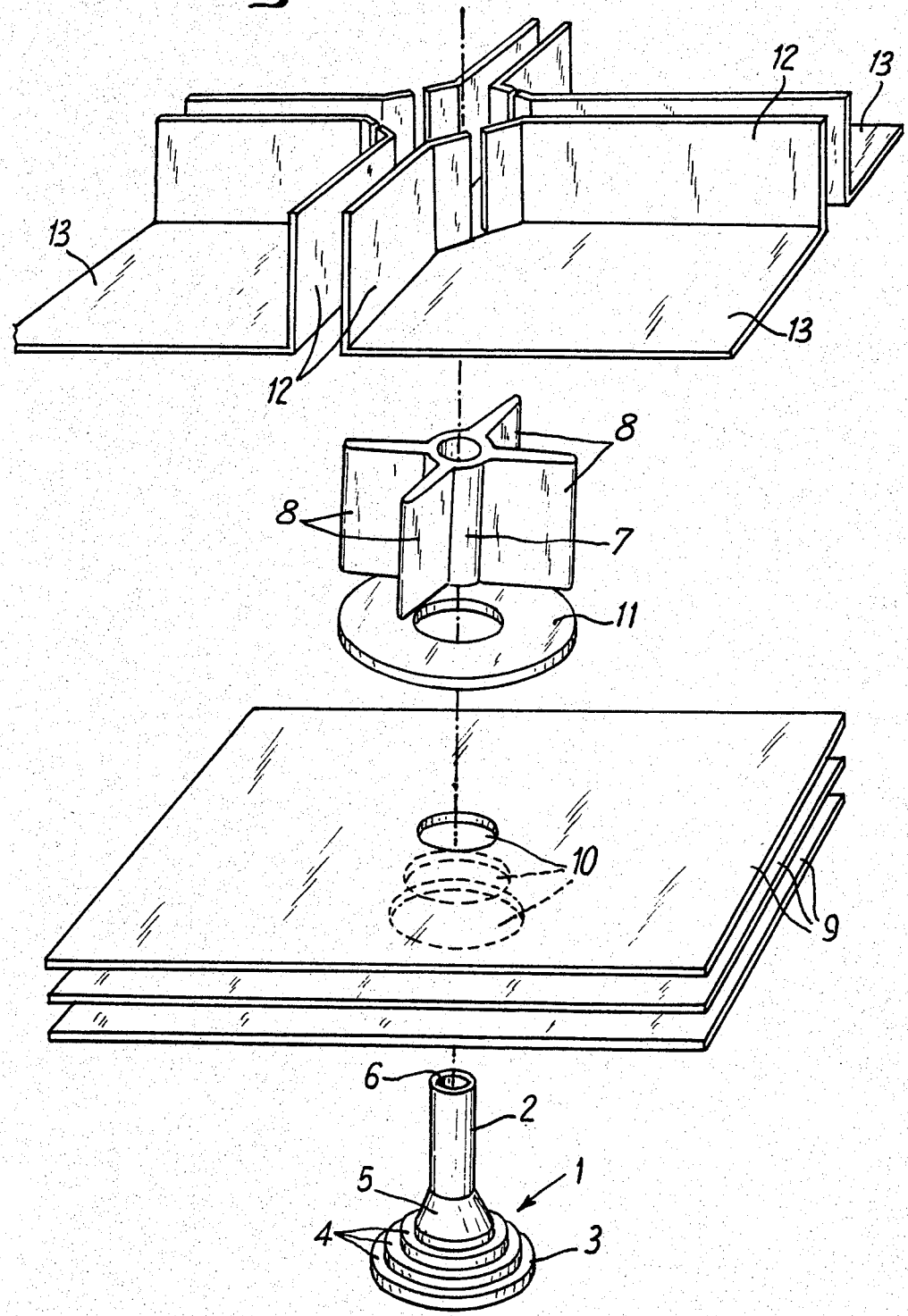
FIG. 1 illustrates diagrammatically in exploded perspective view the essential component elements of the structure, adapted to be closely interconnected with the metal reinforcement.
Figure 4:
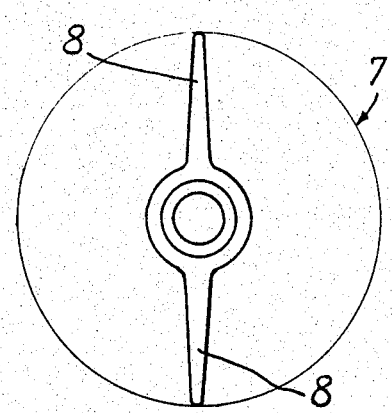
Figure 5:
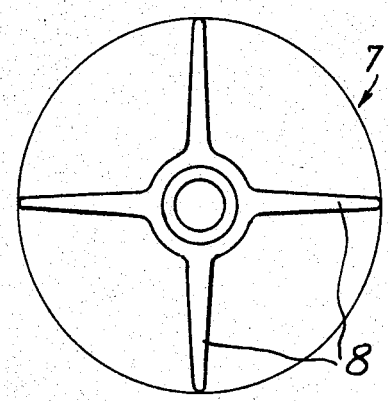
Figure 6:
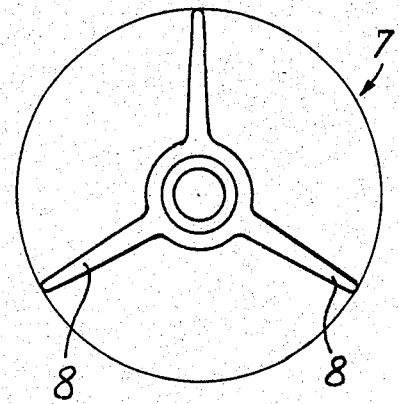
Figure 7:
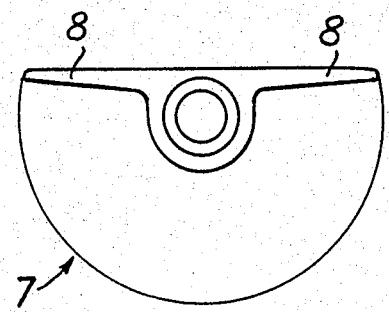
Figure 8:
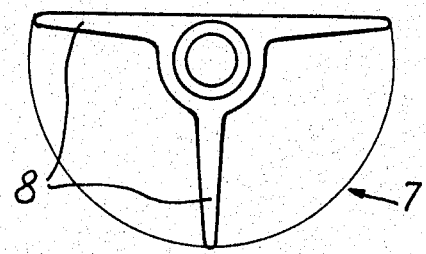
Figure 9:
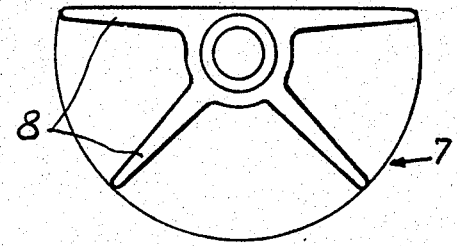

Referring first to FIG. 1, the reference numeral 1 designates the male element constituting the first component element of the metal reinforcing structure. This element comprises a cylindrical portion 2 and a relatively broad annular base 3 provided with steps 4 connected through a frustoconical element 5 to the cylindrical portion 2, the latter having formed coaxially therein a bore 6 extending through the male element 1 and permitting the passage of a rod (not shown) in case of assembling with another, symmetrical structure.

The second element consists of the female element designated by the reference numeral 7 and adapted to cap the first element 1, this second element 7 comprising, around a central tubular core or hub, radial fins or blades 8 distributed and oriented according to the number and directions of the walls connected to the flange coupled to the first element 1 of the reinforcing structure, said walls constituting the frame structure of the assembly. The superposed layers which are to constitute the flange of the frame structure are designated by the reference numeral 9 and have circular holes 10 formed therethrough which correspond to the diameters of the various steps 4 of the annular base 3, so that each layer has the maximal contact area with the element 1 of the metal reinforcing element. The third component element of the metal reinforcement, denoted 11, consists of a washer closely fitted on the tube 2 of element 1 and urged under pressure against the layers 9 preliminarily to the fitting in position of the female element 7. This washer 11 improves the contact between the reinforcement and the material of layers 9 of composite element during the polymerization of the resin contained in this material. In the example shown in FIG. 1, the fins 8 are oriented like the four walls consisting of several layers of fibre-resin compound and formed by portions 12 adapted to be interconnected and also to be coupled to the relevant fins 8 and by portions 13 adapted to be assembled with the surface formed by the aforesaid layers 9.

The registering faces of washer 11 and steps 4 of annular base 3 are provided preferably with projections or grooves designated by reference numerals 14 and 15, respectively, in FIG. 2. These projections or grooves may have different configurations as a function notably of the stress likely to be exerted on the reinforcing member.

FIG. 3 shows the manner in which the above-described elements can be assembled; however, to simplify the drawing, the front fin and the corresponding wall have been omitted from this Figure.

In FIGS. 4 to 9 of the drawings various possible configurations of fins 7 are illustrated by way of example and it is clear that the shapes shown therein, including the fins varying in number and direction, should not be construed as limiting the scope of the invention.

The metal reinforcing structure made of three elements as described hereinabove permits in a first time of properly disposing and assembling the first element 1 and the flange consisting of superposed layers 9, thus providing an adequate initial base as necessary for locating the second element 7 and the walls 12 and eventually obtaining the complete frame structure according to the configuration illustrated.

As already mentioned hereinabove, this frame structure may constitute a half-shell adapted to be assembled with another symmetrical half-shell in order to constitute a hollow beam reinforced internally by the walls coupled to the fins of the metal reinforcements. These two half-shells may be assembled very easily and reliably by means of a screw or a bolt (not shown) of which the shank extends through the common bore 6 of the two symmetrical reinforcing elements implemented.

Of course, various modifications and changes may be brought to the forms of embodiments shown, described and suggested herein, without departing from the basic principles of the invention as set forth in the appended claims.

What we claim is:

1. Method of grafting a metal reinforcement in a node of a structure made of composite materials such as fibres and resin for improving therein the bond between a flange and walls connected to this flange, which comprises:

(a) introducing a cylindrical end of a first element of a metal reinforcement member into openings provided in superposed layers of the flange, said cylindrical end being extended by an annular base portion provided with steps, said openings of the superposed layers being circular and having diameters which correspond with those of said steps of the base portion, so that said layers have a maximal contact area with the base portion of said first element, (b) assembling the walls to radial fins of a second element of the metal reinforcement member rigid with a central tubular core, (c) fitting on said cylindrical end of said first element to a third element of the metal reinforcement member shaped as a washer and urging under pressure said third element against said layers of the flange, and (d) assembling the unit formed by said second element together with the walls to the unit formed by said first and third elements together with the layers, by fitting said central tubular core of the second element on the cylindrical end of the first element.

2. A metal reinforcement member for grafting in a node of a structure made of composite materials such as fibres and resin to improve the bond between a flange and walls connected to this flange, which comprises:

(a) a first element consisting of a cylinder extended by an annular base portion provided with steps, (b) a second element capping said first element and provided with fins or ribs extending along the walls to be connected to said flange, and (c) a third intermediate element consisting of a washer interposed between said first and second elements and adapted to distribute the pressure exerted by said fins or ribs over the base of said first element.

3. A metal reinforcement member according to claim 2, wherein at least some of the faces of the base portion of the first element and of said washer extending around said cylinder are formed with projections or grooves promoting a bonding of the metal reinforcement with the composite fiber and resin material.

* * * * *